United States Patent
Ohno et al.

(10) Patent No.: US 10,752,074 B2
(45) Date of Patent: Aug. 25, 2020

(54) ELECTROMAGNETIC SUSPENSION DEVICE

(71) Applicant: HONDA MOTOR CO., LTD., Tokyo (JP)

(72) Inventors: Satoshi Ohno, Wako (JP); Tomoya Toyohira, Wako (JP); Takafumi Kato, Wako (JP); Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 278 days.

(21) Appl. No.: 15/954,018

(22) Filed: Apr. 16, 2018

(65) Prior Publication Data
US 2018/0297434 A1   Oct. 18, 2018

(30) Foreign Application Priority Data
Apr. 17, 2017 (JP) .................................. 2017-81154

(51) Int. Cl.
*B60G 17/015* (2006.01)
*B60G 17/016* (2006.01)
(Continued)

(52) U.S. Cl.
CPC ....... *B60G 17/0157* (2013.01); *B60G 17/016* (2013.01); *B60G 17/02* (2013.01);
(Continued)

(58) Field of Classification Search
CPC .. B60G 17/0157; B60G 17/016; B60G 17/02; B60G 17/06; B60G 2202/42; B60G 2400/204; B60G 2600/26; B60G 2400/25; B60G 2400/252; B60G 2202/322; F16F 15/03
(Continued)

(56) References Cited

U.S. PATENT DOCUMENTS 4,916,632 A * 4/1990 Doi ...................... B60G 17/018
                                              280/5.515
5,291,406 A * 3/1994 Williams ........... B60G 17/0162
                                              280/5.507
(Continued)

FOREIGN PATENT DOCUMENTS

JP    2010-100094 A    5/2010
JP    2010-132222 A    6/2010

*Primary Examiner* — Dale W Hilgendorf
(74) *Attorney, Agent, or Firm* — Rankin, Hill & Clark LLP

(57) ABSTRACT

An electromagnetic suspension device includes: an electromagnetic actuator which is disposed side by side with a spring member provided between a body and a wheel of a vehicle and which produces a driving force for damping operation and extending and contracting operation; an information acquisition unit which acquires the stroke position of the electromagnetic actuator; and an ECU which sets a target damping force and a target stretching force and controls a driving force of the electromagnetic actuator by using a target driving force based on the set target damping force and target stretching force. When the stroke position acquired by the information acquisition unit is in an end region close to a stroke end, the ECU corrects the target driving force such that the stroke position shifts from the end region toward a neutral region.

6 Claims, 12 Drawing Sheets

(51) Int. Cl.
*B60G 17/06* (2006.01)
*B60G 17/02* (2006.01)

(52) U.S. Cl.
CPC .......... *B60G 17/06* (2013.01); *B60G 2202/42* (2013.01); *B60G 2400/204* (2013.01); *B60G 2600/26* (2013.01)

(58) Field of Classification Search
USPC ..................................................... 701/37, 38
See application file for complete search history.

(56) References Cited

U.S. PATENT DOCUMENTS

| | | | | |
|---|---|---|---|---|
| 6,000,702 | A * | 12/1999 | Streiter | B60G 17/016 280/5.507 |
| 7,427,072 | B2 * | 9/2008 | Brown | B60G 3/06 280/5.5 |
| 2004/0154886 | A1 * | 8/2004 | Hio | B60G 17/0157 188/266 |
| 2010/0059944 | A1 * | 3/2010 | Oteman | B60G 13/001 280/6.157 |
| 2011/0025000 | A1 * | 2/2011 | Inoue et al. | B60G 17/0157 280/5.507 |
| 2015/0224845 | A1 * | 8/2015 | Anderson et al. | B60G 17/0152 701/37 |

* cited by examiner

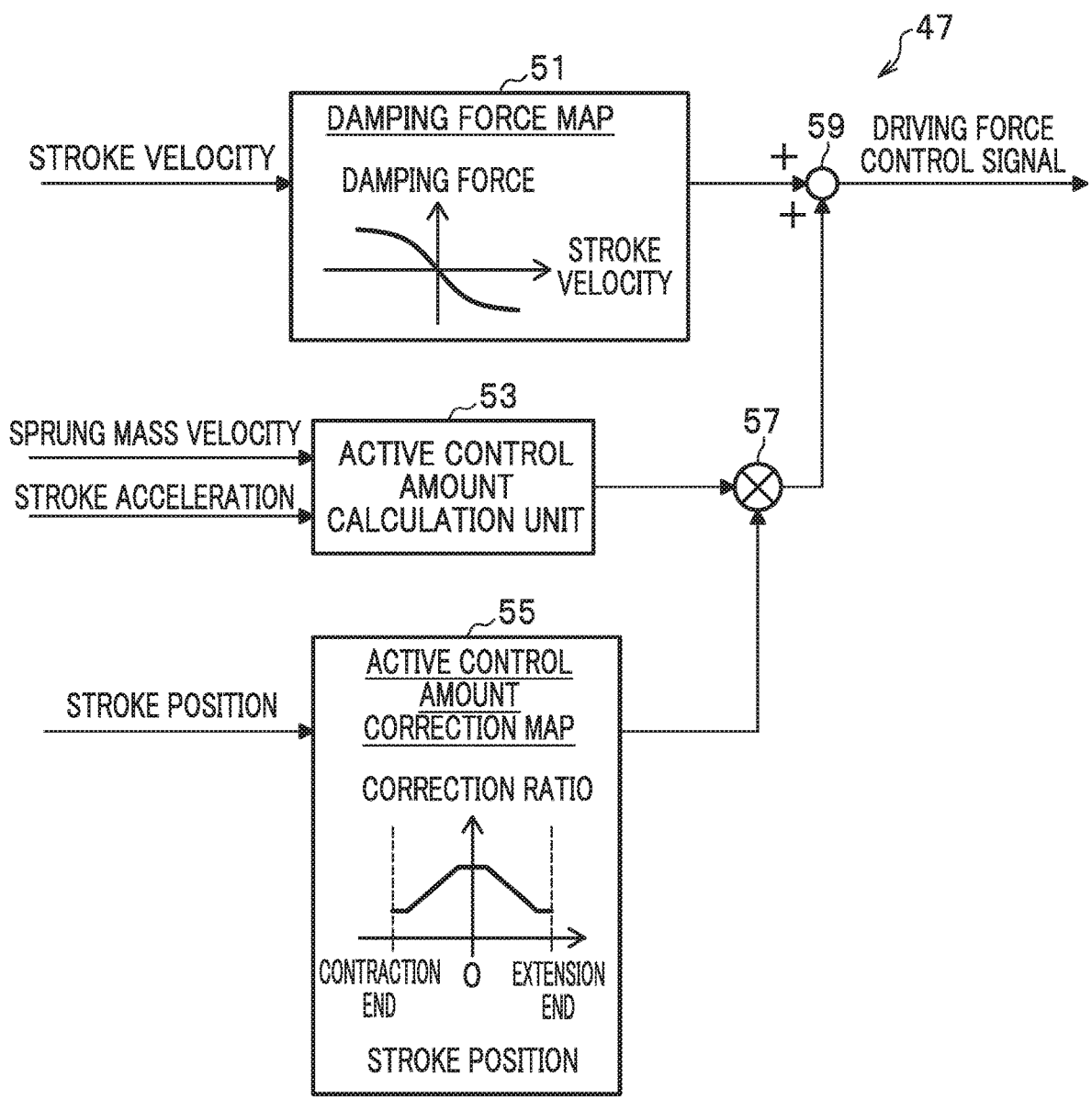

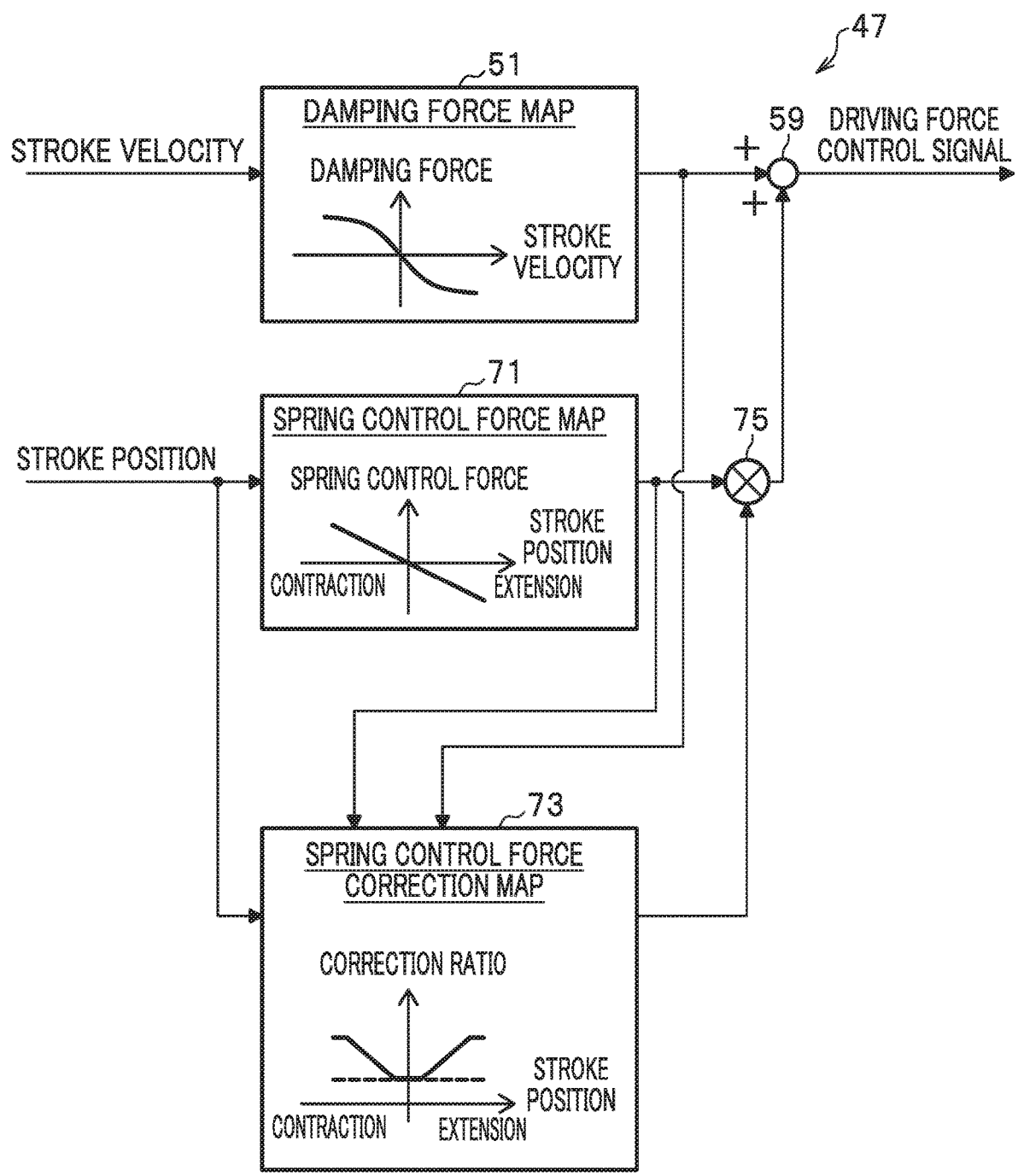

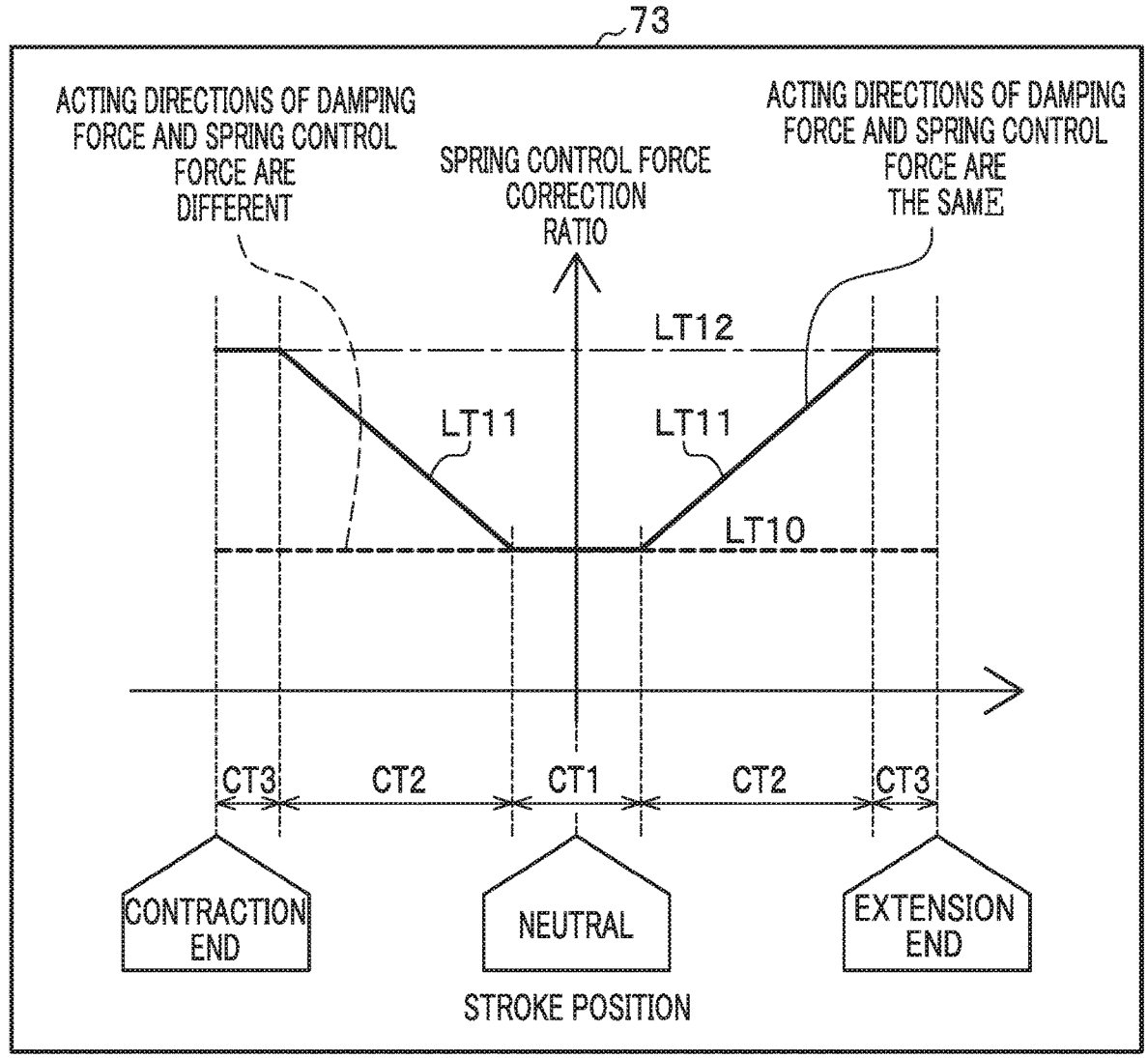

ELECTROMAGNETIC SUSPENSION DEVICE

BACKGROUND OF THE INVENTION

1. Field of the Invention

The present invention relates to an electromagnetic suspension device including an electromagnetic actuator which is disposed side by side with a spring member provided between a body and a wheel of a vehicle and which produces a driving force for damping operation and extending and contracting operation.

2. Description of the Related Art

A conventional electromagnetic suspension device includes an electromagnetic actuator which is disposed side by side with a spring member provided between a body and a wheel of a vehicle and produces a driving force for damping operation and extending and contracting operation (see Japanese Patent Application Publication No. 2010-132222 (Patent Literature 1), for example). The electromagnetic actuator includes a ball screw mechanism in addition to an electric motor. The electromagnetic actuator converts rotary motion of the electric motor to linear motion of the ball screw mechanism to produce a driving force for the damping operation and extending and contracting operation.

Here, the driving force for the damping operation means a damping force. The damping force is a force in a direction different from a direction of stroke velocity of the electromagnetic actuator. The driving force for the extending and contracting operation means a stretching force. The stretching force is a force produced independently of the direction of stroke velocity.

As for the electromagnetic suspension device according to Patent Literature 1, there is a strong demand that the electromagnetic suspension device prevent the vehicle from going into full-bump or full-rebound in order to provide a vehicle's more comfortable ride.

In order to satisfy such a demand, Japanese Patent Application Publication No. 2010-100094 (Patent Literature 2) describes an invention of a variable damping force damper capable of preventing a vehicle from going to full-bump or full-rebound. In the variable damping force damper according Patent Literature 2, when a pair of right and left dampers or a pair of front and rear dampers extend or contract in the same direction, the full-stroke suppression target damping force for one of the pair of dampers is limited depending on the full-stroke suppression target damping force for the other damper.

With the variable damping force damper according to Patent Literature 2, it is possible to avoid full-bump or full-rebound even when one of the paired right and left dampers or front and rear dampers is about to go into full-bump or full-rebound.

However, even when the variable damping force damper according to Patent Literature 2 is used, there is still a risk that the vehicle may go into full-bump or full-rebound in an extreme driving situation in a scene where a wheel rides over a step or the like, for example.

SUMMARY OF THE INVENTION

The present invention has been made to solve the above problems and has an object to provide an electromagnetic suspension device capable of inhibiting a vehicle from going into full-bump or full-rebound in an extreme driving situation.

To achieve the aforementioned object, an invention according to (1) is an electromagnetic suspension device including: an electromagnetic actuator which is disposed side by side with a spring member provided between a body and a wheel of a vehicle and produces a driving force for damping operation and extending and contracting operation; an information acquisition unit which acquires a stroke position of the electromagnetic actuator; and a driving force controller which sets a target damping force as a target value for the damping operation of the electromagnetic actuator, and a target stretching force as a target value for the extending and contracting operation, and controls the driving force of the electromagnetic actuator by using a target driving force based on the set target damping force and target stretching force. When the stroke position acquired by the information acquisition unit is in an end region close to the stroke end, the driving force controller corrects the target driving force such that the stroke position shifts from the end region toward a neutral region.

According to the present invention, the electromagnetic suspension device makes it possible to inhibit a vehicle from going into full-bump or full-rebound in an extreme driving situation.

BRIEF DESCRIPTION OF THE DRAWINGS

FIG. 4A is a block diagram of a driving force calculation unit of an ECU included in an electromagnetic suspension device according to a first embodiment and the peripherals thereof.

FIG. 8A is a block diagram of a driving force calculation unit of an ECU included in an electromagnetic suspension device according to a third embodiment.

FIG. 8B is a diagram for explaining a spring control force correction map included in the driving force calculation unit illustrated in FIG. 8A.

DETAILED DESCRIPTION OF THE EMBODIMENTS

Figure 1:
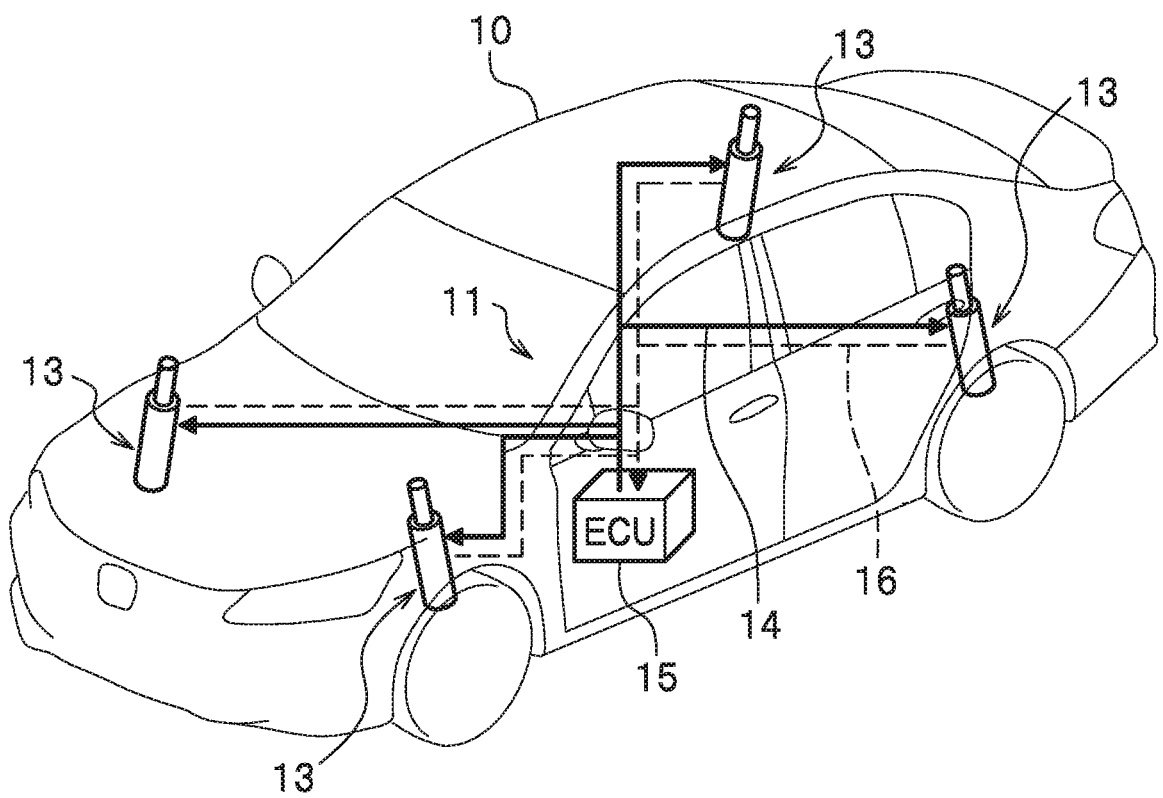
FIG. 1 is an entire configuration diagram of an electromagnetic suspension device according to an embodiment of the present invention.

Electromagnetic suspension devices according to embodiments of the present invention will be hereinafter described in detail with reference to the accompanying drawings.

In the drawings shown below, the same members or similar members are given the same reference numerals. The size and shape of the members are modified or exaggerated for schematic illustration for convenience of explanation.

Summary of Electromagnetic Suspension Device 11 According to Embodiment of Present Invention First, the summary of an electromagnetic suspension device 11 according to an embodiment of the present invention will be described with reference to FIGS. 1 and 2.

FIG. 1 is an entire configuration diagram of the electromagnetic suspension device 11 according to the embodiment of the present invention. FIG. 2 is a partial cross-sectional view of an electromagnetic actuator 13 constituting a part of the electromagnetic suspension device 11.

As illustrated in FIG. 1, the electromagnetic suspension device 11 according to the embodiment of the present invention includes; plural electromagnetic actuators 13 provided for respective wheels of a vehicle 10; and an electronic control unit (hereinafter, referred to as an ECU) 15. The plural electromagnetic actuators 13 and the ECU 15 are connected to each other through power supply lines 14 (see solid lines in FIG. 1) to supply drive control power from the ECU 15 to the plural electromagnetic actuators 13 and signal lines 16 (see dashed lines in FIG. 1) to send stroke positions of the electromagnetic actuators 13 from the electromagnetic actuators 13 to the ECU 15.

In the embodiments, the electromagnetic actuators 13 are provided for the respective wheels, including front wheels (a front right wheel and a front left wheel) and rear wheels (a rear right wheel and a rear left wheel). The plural electromagnetic actuators 13 include four electromagnetic actuators 13 in total.

Each of the plural electromagnetic actuators 13 includes the same configuration in the embodiment. The configuration of one of the electromagnetic actuators 13 will be described instead of the plural electromagnetic actuators 13.

Figure 2:
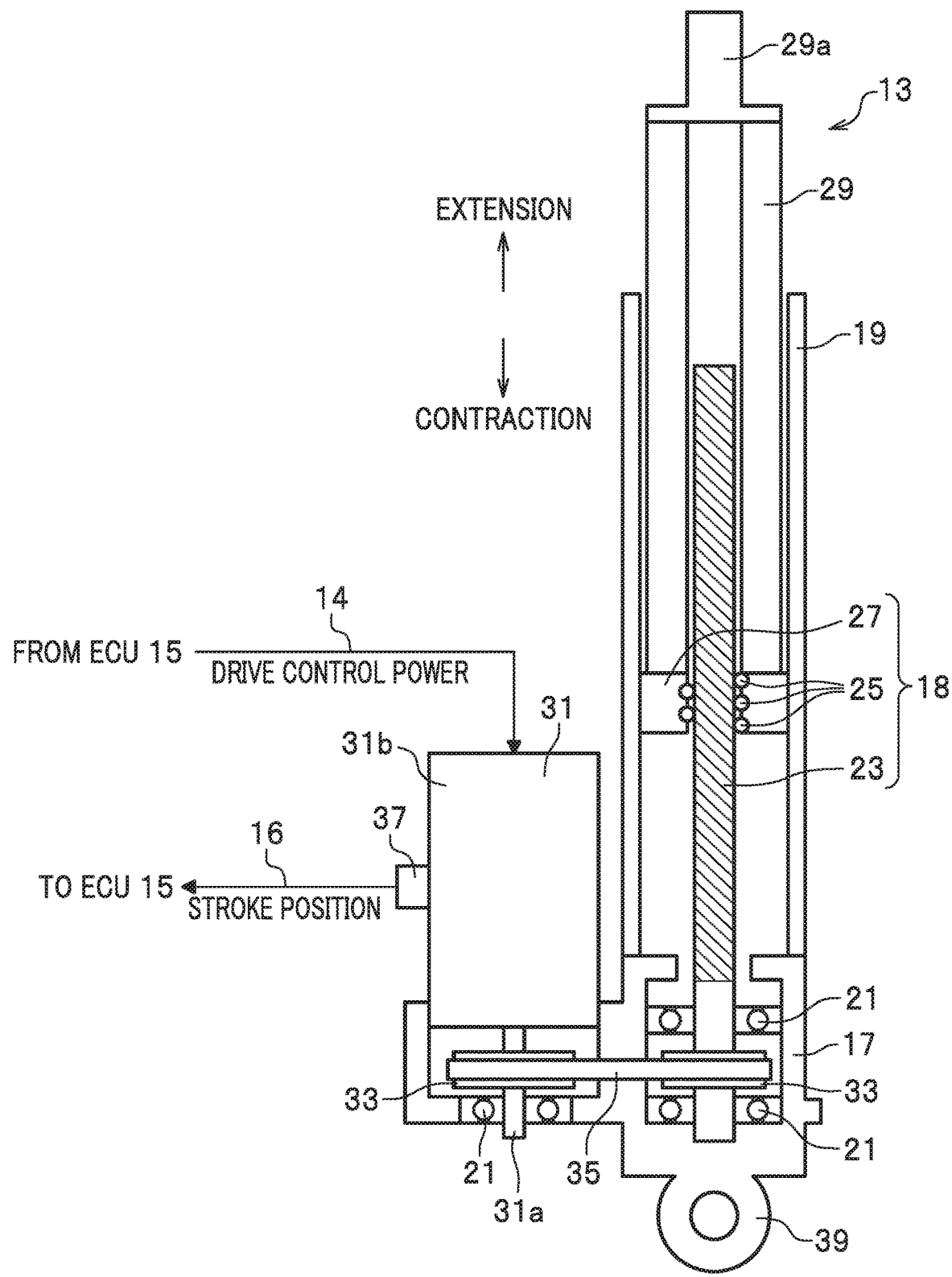
FIG. 2 is a partial cross-sectional view of the electromagnetic actuator included in the electromagnetic suspension device.

The electromagnetic actuator 13 includes a base housing 17, an outer tube 19, a ball bearing 21, a ball screw shaft 23, plural balls 25, a nut 27, and an inner tube 29 as illustrated in FIG. 2.

The base housing 17 supports the proximal end of the ball screw shaft 23 with the ball bearing 21 therebetween so that the ball screw shaft 23 rotates around the axis. The outer tube 19 is provided for the base housing 17 and accommodates a ball screw mechanism 18, which includes the ball screw shaft 23, plural balls 25, and nut 27. The plural balls 25 roll along a screw groove of the ball screw shaft 23. The nut 27 engages with the ball screw shaft 23 with the plural balls 25 interposed therebetween to convert rotary motion of the ball screw shaft 23 to linear motion. The inner tube 29 coupled to the nut 27 is displaced along the axis of the outer tube 19 integrally with the nut 27.

To transmit rotary driving force to the ball screw shaft 23, the electromagnetic actuator 13 includes an electric motor 31, a pair of pulleys 33, and a belt 35 as illustrated in FIG. 2. The electric motor 31 is disposed in the base housing 17 so as to be positioned side by side with the outer tube 19. The pulleys 33 are individually attached to a motor shaft of the electric motor 31 and the ball screw shaft 23. On the pair of pulleys 33, the belt 35 is laid to transmit the rotary driving force of the electric motor 31 to the ball screw shaft 23.

A resolver 37 which detects a rotation angle signal of the electric motor 31 is provided on a casing 31b of the electric motor 31. The rotation angle signal of the electric motor 31 detected by the resolver 37 is transmitted to the ECU 15 through the signal line 16. In the embodiment, the rotation angle of the electric motor 31 can be translated to the stroke position of the electric actuator 13. This is because the stroke position of the electromagnetic actuator 13 is displaced toward an extension end or a contraction end (see FIG. 2) as the rotation angle of the electric motor 31 is displaced. The rotation of the electric motor 31 is controlled by drive control power that the ECU 15 supplies to each of the plural electromagnetic actuators 13 through the power supply line 14.

The embodiment employs the layout in which the motor shaft 31a of the electric motor 31 and ball screw shaft 23 are arranged substantially in parallel to each other to be connected, as illustrated in FIG. 2. The axial dimension of the electromagnetic actuator 13 is thereby shortened. The motor shaft 31a of the electric motor 31 and ball screw shaft 23 may be coaxially arranged to be connected to each other.

The electromagnetic actuator 13 according to the embodiment is provided with a connecting section 39 at the lower end of the base housing 17 as illustrated in FIG. 2. The connecting section 39 is connected and fixed to a not-illustrated sprung mass member (a lower arm or a knuckle on the wheel's side or the like). The upper end 29a of the inner tube 29 is connected and fixed to a not-illustrated un-sprung mass member (a strut tower on the body's side or the like). The electromagnetic actuator 13 is arranged side by side with a not-illustrated spring member provided between the body and a wheel in the vehicle 10. The sprung mass member is provided with a sprung mass acceleration sensor 40, which detects an acceleration of the body (un-sprung mass) along the stroke direction of the electromagnetic actuator 13.

The electromagnetic actuator 13 configured as described above operates as follows. For example, assume that an external force associated with upward movement is applied to the connecting section 39 from a wheel's side of the vehicle 10. In this case, the inner tube 29 and nut 27 integrally moves down relative to the outer tube 19 subjected to the external force associated with the upward vibration. The ball screw shaft 23 then rotates in a direction corresponding to the down movement of the nut 27. In this process, the electric motor 31 then produces rotary driving force in such a direction as to prevent the nut 27 from moving down. The produced rotary driving force of the electric motor 31 is transmitted to the ball screw shaft 23 via the belt 35. In such a manner, a damping force (a force in a direction different from that of stroke velocity) as a reaction force against the external force associated with the upward movement acts on the ball screw shaft 23 to damp the movement which will be transmitted from the wheel side to the body side.

Internal Configuration of ECU 15

Figure 3:
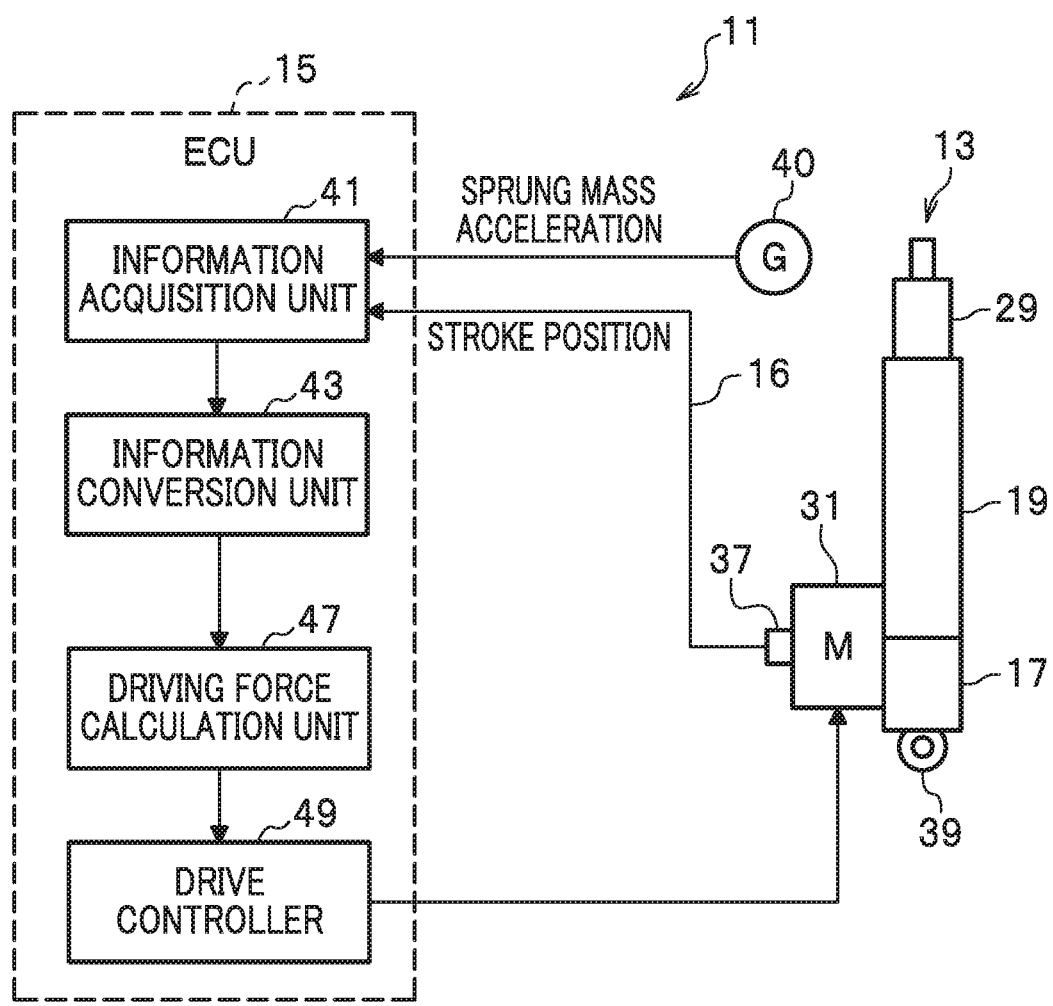
FIG. 3 is a diagram illustrating the internal configuration of an ECU included in the electromagnetic suspension device.

Next, the internal configuration of the ECU 15 included in the electromagnetic suspension device 11 will be described with reference to FIG. 3. FIG. 3 is an internal configuration diagram of the ECU 15 included in the electromagnetic suspension device 11.

The ECU 15 includes a microcomputer performing various computing processes. The ECU 15 includes a driving force control function to individually drive and control the plural electromagnetic actuators 13 based on the rotation angle of the electric motor 31 detected by the resolver 37, that is, the stroke position of the electromagnetic actuator 13, and the like and cause the electromagnetic actuator 13 to generate a driving force for the damping operation and the extending and contracting operation. The ECU 15 corresponds to a driving force controller of the present invention.

To implement the driving force control function, the ECU 15 includes an information acquisition unit 41, an information conversion unit 43, a driving force calculation unit 47, and a drive controller 49 as illustrated in FIG. 3.

The information acquisition unit 41 acquires information including the rotation angle of the electric motor 31 detected by the resolver 37, that is, the stroke position of the electromagnetic actuator 13 and sprung mass acceleration detected by the sprung mass acceleration sensor 40. The information including the stroke position of the electromagnetic actuator 13 and the sprung mass acceleration, which are acquired by the information acquisition unit 41, is transmitted to the information conversion unit 43.

The information conversion unit 43 differentiates the displacement of the stroke position of the electromagnetic actuator 13 acquired by the information acquisition unit 41, with respect to time to calculate stroke velocity of the electromagnetic actuator 13 (hereinafter, just referred to as stroke velocity in some cases). The information conversion unit 43 differentiates the stroke velocity with respect to time to calculate stroke acceleration of the electromagnetic actuator 13 (hereinafter, just referred to as stroke acceleration in some cases). The information conversion unit 43 integrates the sprung mass acceleration acquired by the information acquisition unit 41 with respect to time to calculate sprung mass velocity.

The information including the stroke velocity, stroke acceleration, and sprung mass velocity calculated by the information conversion unit 43 is transmitted to the driving force calculation unit 47.

The driving force calculation unit 47 receives the information including the stroke velocity, stroke acceleration, and sprung mass velocity and calculates a driving force control signal including a target driving force with reference to the received information, a damping force map 51, an active control amount calculation unit 53, and an active control amount correction map 55, which are described later. The driving force control signal including the target driving force as the result of calculation by the driving force calculation unit 47 is transmitted to the drive controller 49. The calculation performed by the driving force calculation unit 47 is described in detail later.

The drive controller 49 supplies drive control power to the electric motor 31, which is provided for each of the plural electromagnetic actuators 13, in accordance with the driving force control signal transmitted from the driving force calculation unit 47 for separately driving and controlling the plural electromagnetic actuators 13. In the process of generating the drive control power to be supplied to the electric motor 31, an inverter control circuit can be suitably used, for example.

Figure 4B:
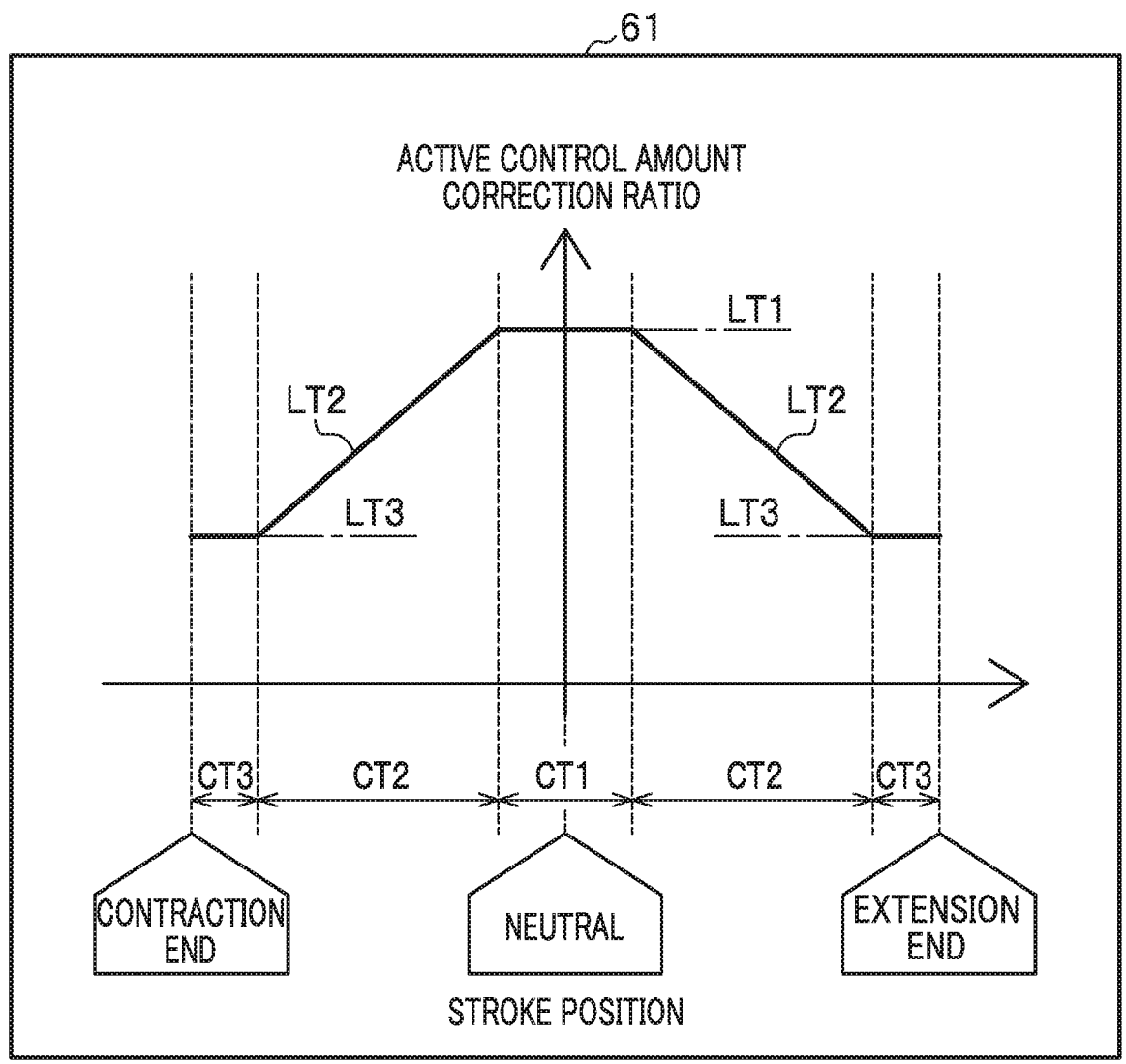
FIG. 4B is a diagram for explaining an active control amount correction map included in the driving force calculation unit illustrated in FIG. 4A.

Block Configuration of Driving Force Calculation Unit 47 and Peripherals According to First Embodiment Next, the block configuration of the driving force calculation unit 47 of the ECU 15 included in the electromagnetic suspension device 11 according to a first embodiment (hereinafter, referred to as the driving force calculation unit 47 according to the first embodiment) will be described with reference to FIGS. 4A and 4B. FIG. 4A is a block diagram of the driving force calculation unit 47 and peripherals according to the first embodiment. FIG. 4B is a diagram for explaining the active control amount correction map 55 included in the driving force calculation unit 47 illustrated in FIG. 4A.

The driving force calculation unit 47 according to the first embodiment includes the damping force map 51, the active control amount calculation unit 53, the active control amount correction map 55, a multiplier 57, and an adder 59 as illustrated in FIG. 4A.

The damping force map 51 stores standard values of a damping force altered in relation to changes in the stroke velocity as illustrated in FIG. 4A. The standard values of the damping force are actually stored as standard values of damping force control current.

In the example illustrated in FIG. 4A, the damping force is set to have the following characteristics. The damping force directed to the contraction end increases when the stroke velocity toward the extension end increases. The damping force directed to the extension end increases as the stroke velocity directed to the contraction end increases. These characteristics conform to the characteristics of conventionally used hydraulic dampers. When the stroke velocity is zero, the damping force corresponding thereto is set to zero.

The driving force calculation unit 47 according to the first embodiment calculates the standard value of the damping force that corresponds to the inputted stroke velocity, with reference to the stroke velocity calculated by the information conversion unit 43 and the contents stored in the damping force map 51.

The active control amount calculation unit 53 calculates the standard value of an active control amount for a stretching force (a force produced independently of the direction of the stroke velocity) instantaneously adaptable to a change in the driving condition and position of the vehicle in order to maintain the comfortable vehicle's ride. Specifically, as illustrated in FIG. 4A, the active control amount calculation unit 53 receives the sprung mass velocity and stroke acceleration calculated by the information conversion unit 43 and based on the received information, calculates the standard value of the active control amount for skyhook control or the like. The thus-calculated standard value of the active control amount is transmitted to the multiplier 57.

The active control amount correction map 55 stores values of the active control amount correction ratio altered in relation to changes in the stroke position as illustrated in FIGS. 4A and 4B. The active control amount correction ratio takes a value between and including 0 and 1. The active control amount correction ratio is multiplied by the standard value of the active control amount. The standard value of the active control amount is thus corrected to a value appropriate to the stroke position, which is changing constantly.

Herein, the characteristics of the active control amount correction ratio stored in the active control amount correction map 55 will be described with reference to FIG. 4B.

In the case where the stroke position is in a neutral region CT1 around the neutral position, the active control amount correction ratio is set to a fixed value of 1 as an active control amount correction ratio LT1. In the case where the stroke position is in an extension end region CT3 located in the vicinity of the extension end or a contraction end region CT3 located in the vicinity of the contraction end, the active control amount correction ratio is set to a fixed value of 2/5

(0.4) as an active control amount correction ratio LT3. In the case where the stroke position is in middle regions CT2 and CT2 between the neutral region CT1 and the respective extension- and contraction-end regions CT3 and CT3, as an active control amount correction ratio LT2, the active control amount correction ratio is set to a variable that linearly decreasing asymptotically as the stroke position approaches the extension or contraction end.

The active control amount correction ratio LT3 is determined such that the active control amount is smaller when the stroke position is in the extension- or contraction end region CT3 than that when the stroke position is in or near the neutral region CT1 away from the region CT3 for the following reason. Specifically, in the case where the stroke position is in the extension- or contraction end region CT3, the vehicle is more likely to go into full-bump or full-rebound. In such a case, the active control amount correction ratio LT3 is set to a smaller value than LT1 and LT2 so as to reduce the active control amount for the stretching force. The standard value of the active control amount for the stretching force is thereby corrected and reduced such that the stroke position shifts from the end region CT3 toward the neutral region CT1. This is intended to inhibit the vehicle from going into full-bump or full-rebound.

When the electromagnetic actuator 13 is provided with a bump stopper and a rebound stopper (not illustrated) composed of elastic members, it is preferable to perform the control to correct the target driving force with enough time before any constituent member of the electromagnetic actuator 13 comes into contact with the bump or rebound stopper. This is because the present invention is intended to inhibit the vehicle from going into full-bump or full-rebound.

The driving force calculation unit 47 according to the first embodiment, by the active control amount calculation unit 53, receives the sprung mass velocity and stroke acceleration calculated by the information conversion unit 43 and, based on the received information, calculates the standard value of the active control amount for the stretching force, that is instantaneously adaptable to a change in the vehicle's driving condition and position. The driving force calculation unit 47 according to the first embodiment, by the multiplier 57, multiplies the standard value of the active control amount calculated by the active control amount calculation unit 53, by the value of the active control amount correction ratio calculated with reference to the active control amount correction map 55 to calculate the active control amount corrected based on the stroke position.

The driving force calculation unit 47 according to the first embodiment, by the adder 59, adds the active control amount corrected based on the stroke position to the standard value of the damping force calculated with reference to the damping force map 51 to generate a driving force control signal including the target driving force obtained by integration of the damping force and active control amount. The thus-generated driving force control signal including the target driving force is transmitted to the drive controller 49. Upon receiving the driving force control signal, the drive controller 49 drives and controls the plural electromagnetic actuators 13.

Figure 5:
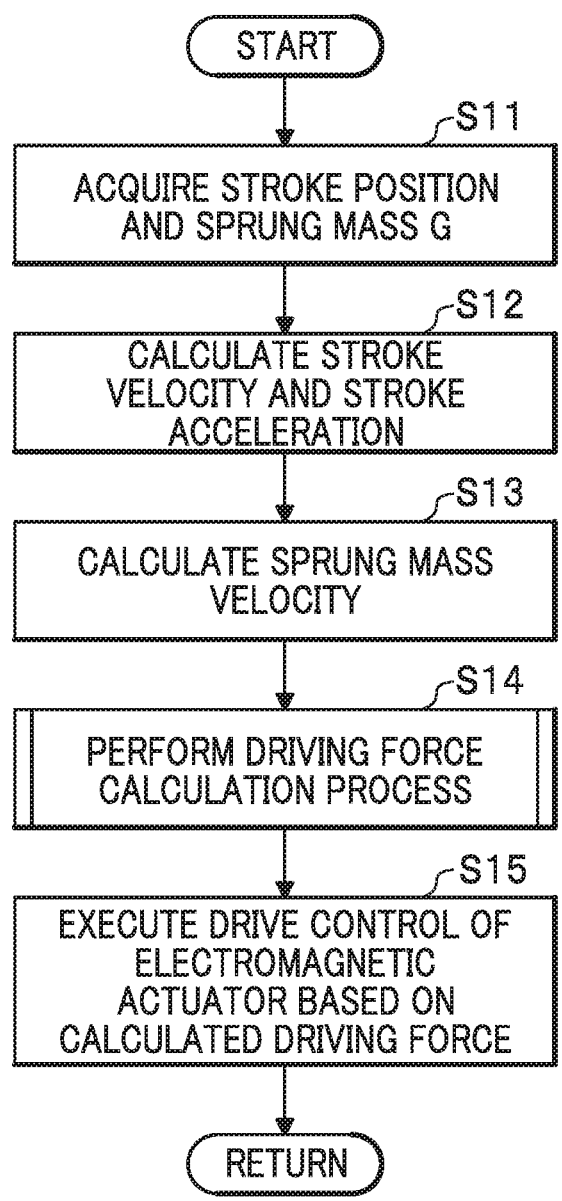
FIG. 5 is a flowchart for explaining the operation of the electromagnetic suspension device according to the embodiments of the present invention.

Operation of Electromagnetic Suspension Device 11 According to Embodiment of Invention Next, the operation of the electromagnetic suspension device 11 according to the embodiment of the present invention will be described with reference to FIG. 5. FIG. 5 is a flowchart for explaining the operation of the electromagnetic suspension device 11 according to the embodiment of the present invention.

In step S11 illustrated in FIG. 5, the information acquisition unit 41 of the ECU 15 acquires the information including the stroke position of the electromagnetic actuator 13 and the sprung mass acceleration. The information including the stroke position of the electromagnetic actuator 13 and the sprung mass velocity which are acquired by the information acquisition unit 41 is transmitted to the information conversion unit 43.

In step S12, the information conversion unit 43 of the ECU 15 differentiates with respect to time, the stroke position acquired in the step S11 to calculate the stroke velocity. The information conversion unit 43 of the ECU 15 differentiates with respect to time, the stoke velocity to calculate the stroke acceleration of the electromagnetic actuator 13. The information including the thus-calculated stroke velocity and stroke acceleration is transmitted to the driving force calculation unit 47.

In step S13, the information conversion unit 43 of the ECU 15 integrates with respect to time, the sprung mass acceleration acquired in the step S11 to calculate the sprung mass velocity. The information including the thus-calculated sprung mass velocity is transmitted to the driving force calculation unit 47.

In step S14, the driving force calculation unit 47 of the ECU 15 receives the information on the stroke position, stroke velocity, stroke acceleration, and sprung mass velocity and performs a driving force calculation process with reference to the received information, the damping map 51, the standard value of the active control amount calculated by the active control amount calculation unit 53, and the active control amount correction map 55, calculating the driving force control signal including the target driving force.

To be more specific, the driving force calculation unit 47 according to the first embodiment calculates the standard value of the damping force that corresponds to the received stroke velocity, with reference to the stroke velocity received from the information conversion unit 43 and the contents stored in the damping map 51 (the damping force altered in relation to changes in the stroke velocity).

Next, the active control amount calculation unit 53 of the driving force calculation unit 47 according to the first embodiment receives the sprung mass velocity and stroke acceleration calculated by the information conversion unit 43 and calculates the standard value of the active control amount for the stretching force based on the aforementioned information.

Next, the driving force calculation unit 47 according to the first embodiment calculates the value of the active control amount correction ratio that corresponds to the received stroke position with reference to the stroke position acquired by the information acquisition unit 41 and the contents stored in the active control amount correction map 55 (values of the active control amount correction ratio altered in relation to changes in the stroke position). The driving force calculation unit 47 according to the first embodiment multiplies the standard value of the active control amount calculated by the active control amount calculation unit 53, by the value of the active control amount correction ratio calculated with reference to the active control amount correction map 55, calculating the active control current value corresponding to the active control amount.

Next, the adder 59 of the driving force calculation unit 47 according to the first embodiment adds the corrected active control amount to the standard value of the damping force calculated with reference to the damping map 51 to generate the driving force control signal including the target driving force obtained by integration of the damping force and the active control amount.

In step S15, the drive controller 49 of the ECU 15 supplies drive control power to the electric motor 31, which is provided for each of the plural electromagnetic actuators 13, in accordance with the driving force control signal generated by the operation in the step S14, for driving and controlling the plural electromagnetic actuators 13.

In the electromagnetic suspension device 11 according to the first embodiment, the active control amount is corrected finely in accordance with the stroke position. The electromagnetic suspension device 11 calculates the value of the active control amount correction ratio that corresponds to the stroke position, with reference to the active control correction map 55, and uses the calculated value of the active control amount correction ratio to correct the standard value of the active control amount for the stretching force.

The standard value of the damping force is added to the corrected standard value of the active control amount for stretching force. When the stroke position is in the end regions CT3, which are close to the stroke ends, the target driving force is corrected and increased such that the stroke position shifts from the end region CT3 toward the neutral region CT1.

The electromagnetic suspension device 11 according to the first embodiment is capable of inhibiting a vehicle from going into full-bump or full-rebound in an extreme driving situation.

Figure 6A:
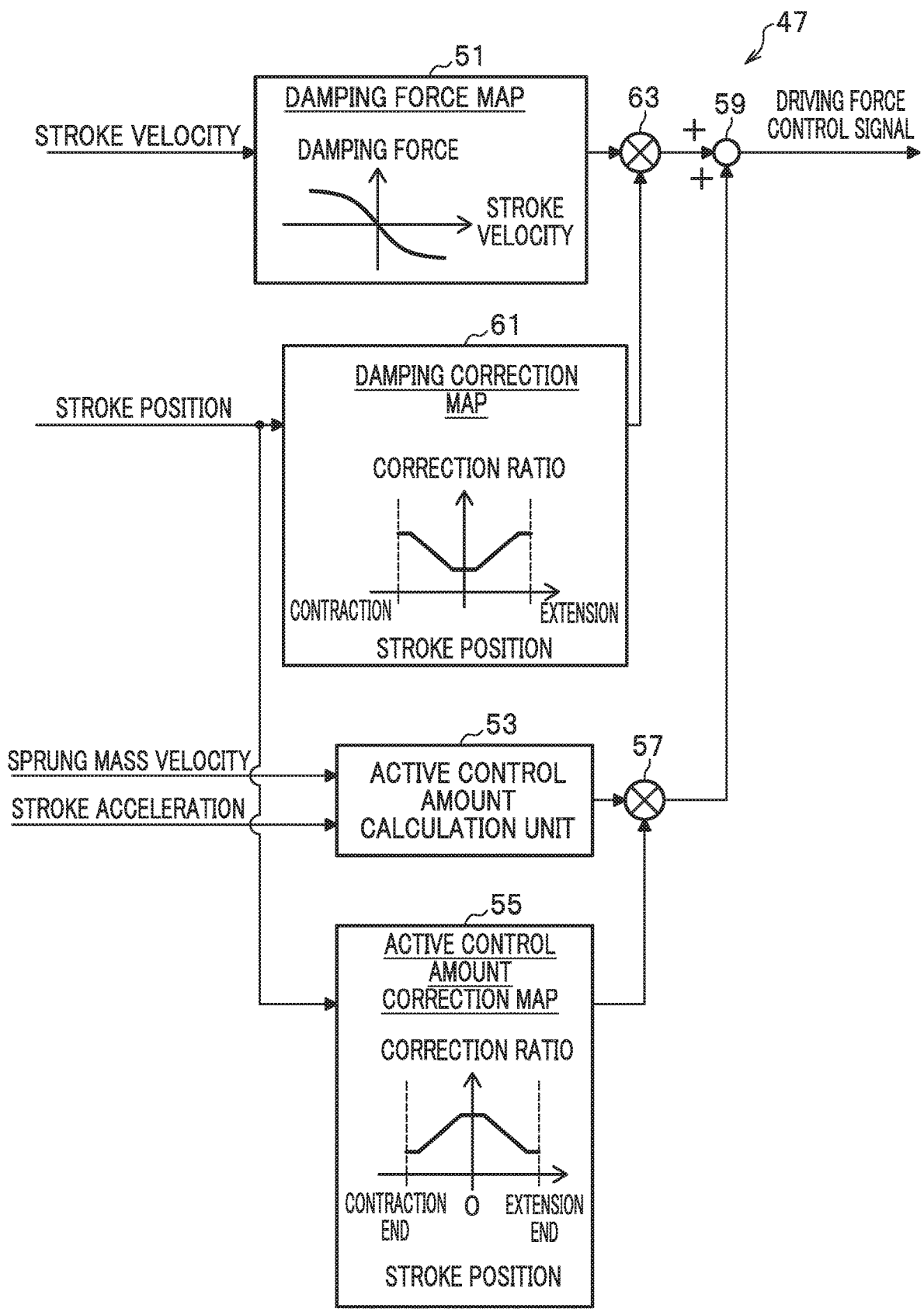
FIG. 6A is a block diagram of a driving force calculation unit of an ECU included in an electromagnetic suspension device according to a modification of the first embodiment.
Figure 6B:
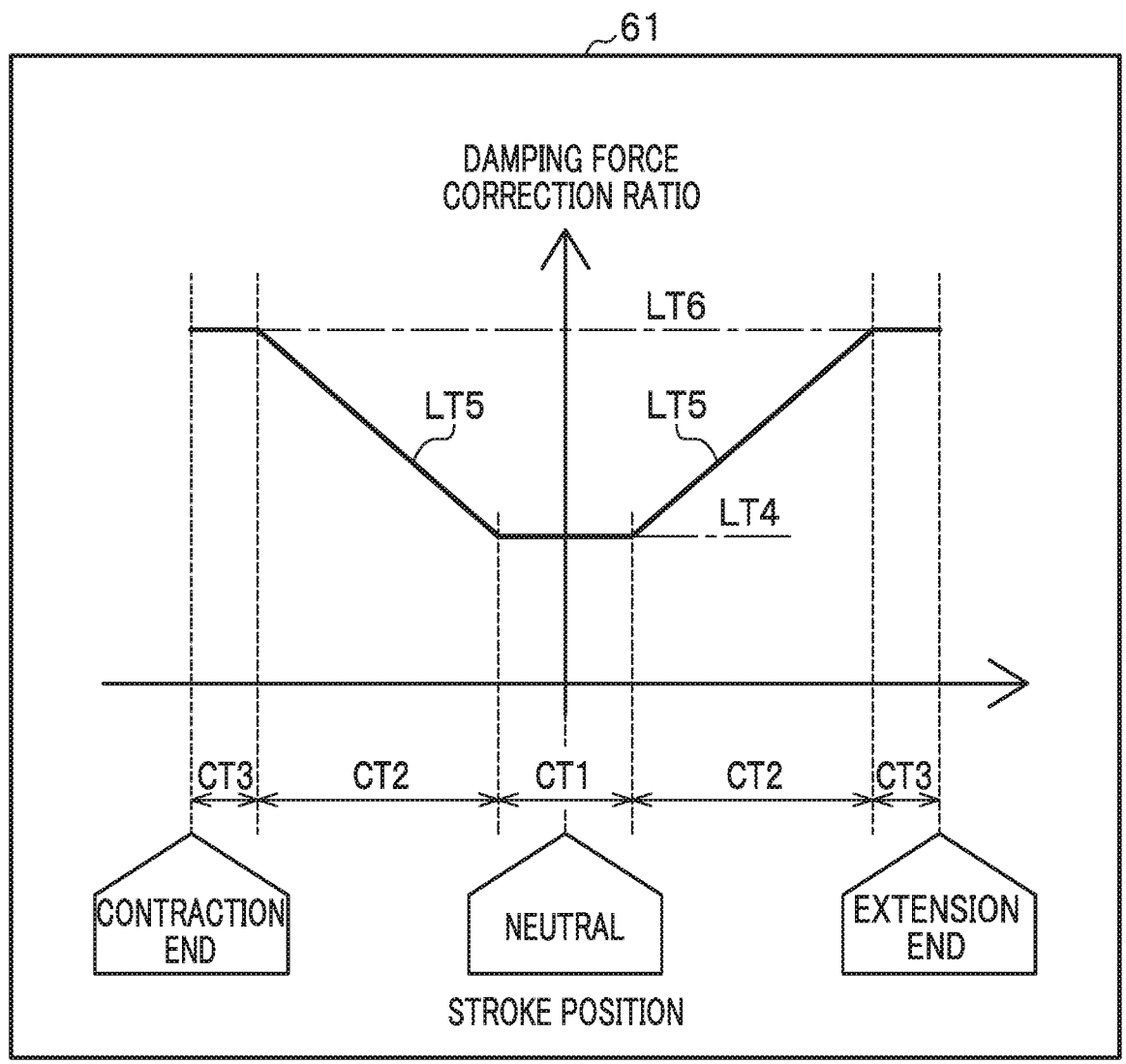
FIG. 6B is a diagram for explaining a damping force correction map included in the driving force calculation unit illustrated in FIG. 6A.

Block Configuration of Driving Force Calculation Unit 47 and Peripherals According to Modification of First Embodiment Next, the driving force calculation unit 47 of the ECU 15 included in the electromagnetic suspension device 11 and the peripherals thereof according to a modification of the first embodiment (hereinafter, referred to as the driving force calculation unit 47 according to the modification of the first embodiment) will be described with reference to FIGS. 6A and 6B. FIG. 6A is a block configuration diagram illustrating the driving force calculation unit 47 and the peripherals thereof according to the modification of the first embodiment. FIG. 6B is a diagram for explaining a damping force correction map 61 included in the driving force calculation unit 47 illustrated in FIG. 6A.

Herein, many constituent components of the driving force calculation unit 47 according to the modification of the first embodiment are the same as those of the driving force calculation unit 47 according to the first embodiment. Different constituent components between the driving force calculation units 47 according to the modification of the first embodiment and according to the first embodiment will be described in place of the driving force calculation unit 47 according to the modification of the first embodiment.

As illustrated in FIG. 6A, the driving force calculation unit 47 according to the modification of the first embodiment includes a damping force correction map 61 and a multiplier 63 in addition to the damping force map 51, active control amount calculation unit 53, active control amount correction map 55, multiplier 57, and adder 59, which are the same constituent components as those of the driving force calculation unit 47 according to the first embodiment.

The damping force correction map 61 according to the modification of the first embodiment stores values of the damping force correction ratio altered in relation to changes in the stroke position. The damping force correction ratio takes a value between and including 0 and 1. The damping force correction ratio is multiplied by the standard value of the damping force. The standard value of the damping force is thereby corrected to a value appropriate to the stroke position, which is changing constantly.

Herein, the characteristics of the damping force correction ratio stored in the damping force correction map 61 will be described with reference to FIG. 6B. In the case where the stroke position is in the neutral region CT1, the damping force correction ratio is set to a fixed value of 2/5 (0.4) as a damping force correction ratio LT4. In the case where the stroke position is in the extension end region CT3 or the contraction end region CT3, the damping force correction ratio is set to a fixed value of 1 as a damping force correction ratio LT6. In the case where the stroke position is in the middle regions CT2, the damping force correction ratio is set to a variable that linearly increasing asymptotically as the stroke position approaches the extension or contraction end, as a damping force correction ratio LT5.

The damping force correction ratio LT6 is determined such that the damping force is larger when the stroke position is in the extension- or contraction end region CT3 than that when the stroke position is in or near the neutral region CT1 away from the region CT3 for the following reason. Specifically, the case where the stroke position is in the extension- or contraction end region CT3 means that the vehicle is more likely to go into full-bump or full-rebound. The damping force is therefore increased in such a case by setting the damping force correction ratio LT6 larger than LT4 or LT5. This is intended to prevent the vehicle from going into full-bump or full-rebound.

The driving force calculation unit 47 according to the modification of the first embodiment calculates a value of the damping correction ratio that corresponds to the stroke position with reference to the stroke position and the contents stored in the damping force correction map 61. The driving force calculation unit 47 according to the modification of the first embodiment multiplies the value of the damping force correction ratio that corresponds to the stroke position by the standard value of the damping force calculated with reference to the damping force map 51, generating the damping force control signal including the damping force corrected based on the stroke position.

The driving force calculation unit 47 according to the modification of the first embodiment receives the sprung mass velocity and stroke acceleration calculated by the information conversion unit 43, by the active control amount calculation unit 53 and, based on the received information, calculates the standard value of the active control amount for the stretching force that is instantaneously adaptable to a change in the vehicle's driving condition and position. Moreover, the driving force calculation unit 47 according to the modification of the first embodiment, by the multiplier 57, multiplies the standard value of the active control amount calculated by the active control amount calculation unit 53 by the value of the active control amount correction ratio calculated with reference to the active control amount correction map 55 to calculate the active control amount corrected based on the stroke position.

In the driving force calculation unit 47 according to the modification of the first embodiment, the adder 59 adds the active control amount corrected based on the stroke position to the damping force corrected based on the stroke position to generate the driving force control signal including the target driving force obtained by integration of the damping force and active control amount. The thus-generated driving force control signal including the target driving force is transmitted to the drive controller 49. Upon receiving the driving force control signal, the drive controller 49 drives and controls the plural electromagnetic actuators 13.

In the electromagnetic suspension device 11 according to the modification of the first embodiment, the driving force calculation unit 47 calculates the damping force corrected based on the stroke position by multiplying the standard value of the damping force calculated with reference to the damping force map 51 by the value of the damping force correction ratio that corresponds to the stroke position. The driving force calculation unit 47 calculates the active control amount corrected based on the stroke position by multiplying the standard value of the active control amount calculated by the active control amount calculation unit 53 by the value of the active control amount correction ratio calculated with reference to the active control amount correction map 55. The driving force calculation unit 47 then adds the damping force corrected based on the stroke position to the active control amount corrected based on the stroke position to calculate the target driving force obtained by integration of the damping force and active control amount.

In the modification of the first embodiment, when the stroke position is in the extension end region CT3 or contraction end region CT3, the electromagnetic suspension device 11 determines that the vehicle is likely to go into full-bump or full-rebound, and therefore performs correction to render the target driving force larger than that when the stroke position is in or near the neutral region CT1 away from the end region CT3.

The electromagnetic suspension device 11 according to the modification of the first embodiment is capable of correcting the damping force and active control amount finely in accordance with the stroke position. As a result, the effect of inhibiting the vehicle from going into full-bump or full-rebound in an extreme driving situation is further increased compared with the electromagnetic suspension device 11 according to the first embodiment.

Figure 7A:
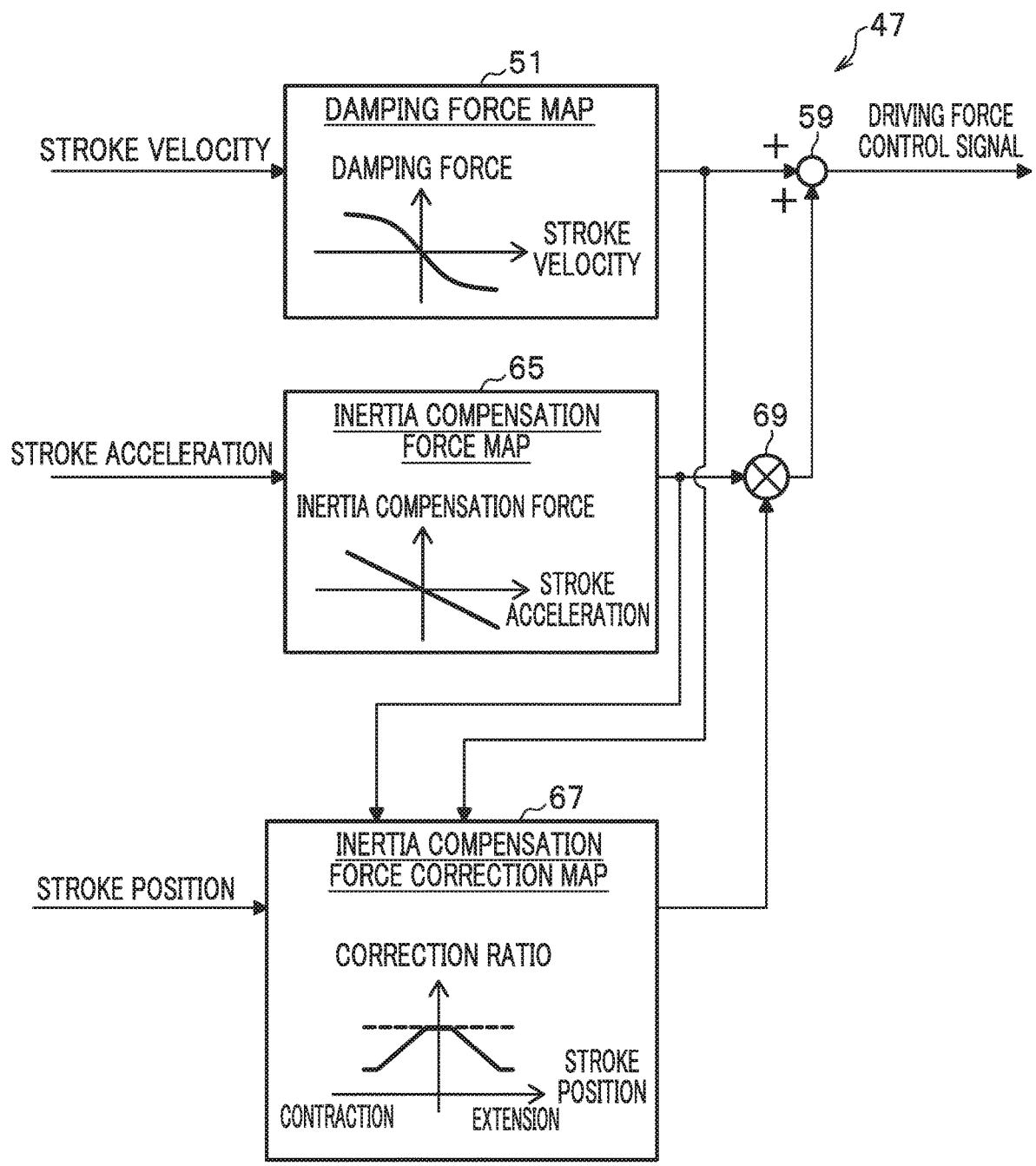
FIG. 7A is a block diagram of a driving force calculation unit of an ECU included in an electromagnetic suspension device according to a second embodiment.
Figure 7B:
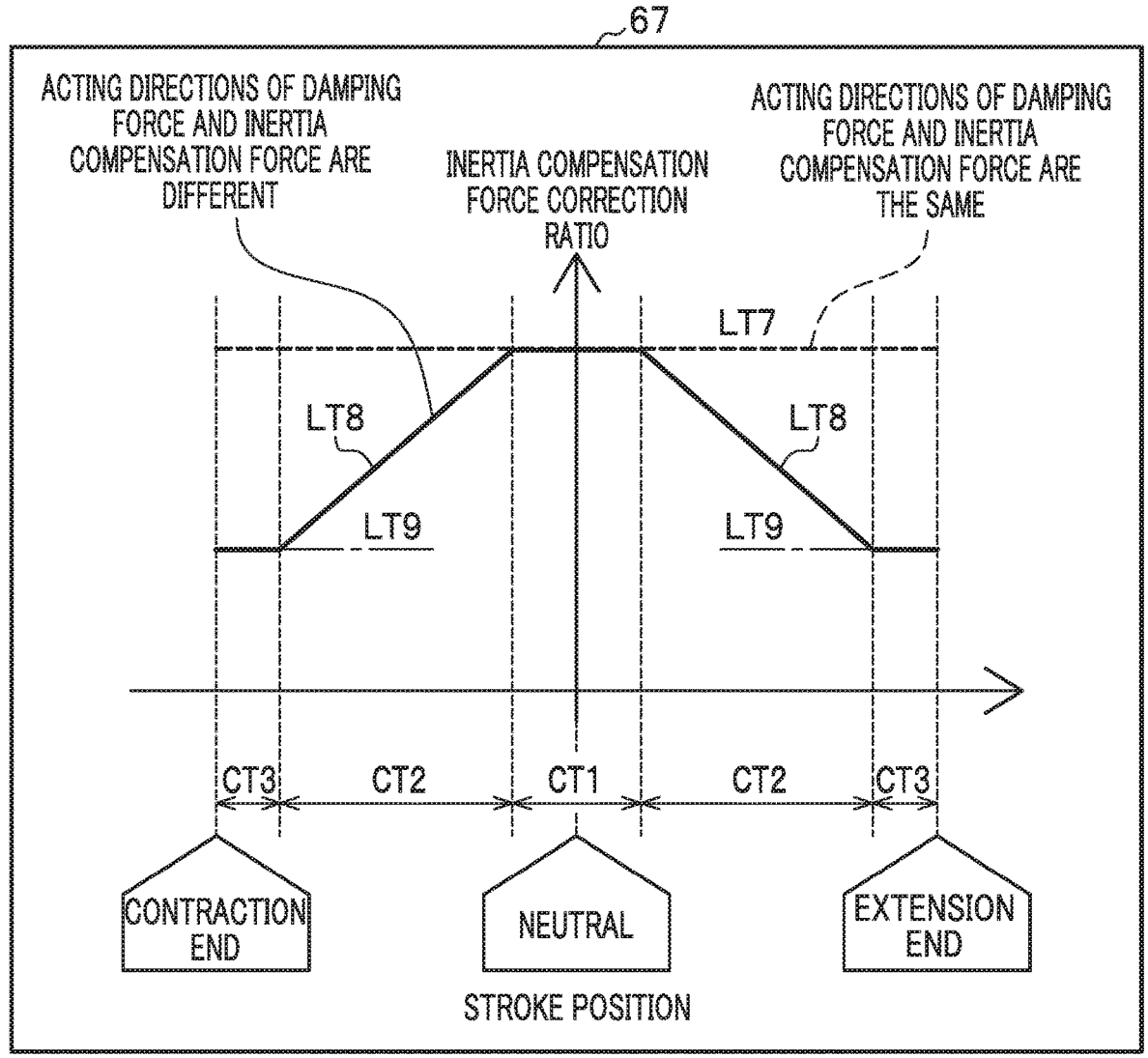
FIG. 7B is a diagram for explaining an inertia compensation force correction map included in the driving force calculation unit illustrated in FIG. 7A.

Block Configuration of Driving Force Calculation Unit 47 and Peripherals According to Second Embodiment Next, the block configuration of the driving force calculation unit 47 of the ECU 15 included in the electromagnetic suspension device 11 according to a second embodiment (hereinafter, referred to as the driving force calculation unit 47 according to the second embodiment) will be described with reference to FIGS. 7A and 7B. FIG. 7A is a block configuration diagram of the driving force calculation unit 47 and peripherals thereof according to the second embodiment. FIG. 7B is a view for explaining an inertia compensation force correction map 67 included in the driving force calculation unit 47 illustrated in FIG. 7A.

Herein, many constituent components of the driving force calculation unit 47 according to the second embodiment are the same as those of the driving force calculation unit 47 according to the first embodiment. Different constituent components between the driving force calculation units 47 according to the first and second embodiments will be described in place of the driving force calculation unit 47 according to the second embodiment.

As illustrated in FIG. 7A, the driving force calculation unit 47 according to the second embodiment includes an inertia compensation force map 65, the inertia compensation force correction map 67, and a multiplier 69 in addition to the damping force map 51 and adder 59, which are the same constituent components as those of the driving force calculation unit 47 according to the first embodiment.

The inertia compensation force map 65 according to the second embodiment stores standard values of inertia compensation force altered in relation to changes of the stroke acceleration calculates by the information conversion unit 43.

Herein, the inertia compensation force will be described. In the electromagnetic actuator 13, the inertia component accompanying rotation of a rotor (not illustrated) incorporated in the electric motor 31, the inertia component accompanying drive of the ball screw mechanism 18 (see FIG. 2), and the like can degrade the damping characteristics. The driving force calculation unit 47 according to the second embodiment includes a function to adjust the inertia compensation force in order to reduce the influence of the inertia component accompanying drive of the constituent members of the electromagnetic actuator 13.

In the example illustrated in FIG. 7A, the inertia compensation force is configured to have the following characteristics. The inertia compensation force directed to the contraction end increases linearly as the stroke acceleration toward the extension end increases. The inertia compensation force directed to the extension end linearly increases as the stroke acceleration toward the contraction side increases. When the stroke acceleration is zero, the inertia compensation force corresponding thereto is set to zero.

The inertia compensation force correction map 67 according to the second embodiment stores values of the inertia compensation force correction ratio altered in relation to changes in the stroke position as illustrated in FIGS. 7A and 7B. The inertia compensation force correction ratio takes a value between and including 0 and 1. The inertia compensation force correction ratio is multiplied by the standard value of the inertia compensation force acquired based on the stroke position and inertia compensation force correction map 67. The standard value of the inertia compensation force is thereby corrected to a value appropriate to the stroke position, which is changing constantly.

Herein, the characteristics of the inertia compensation force correction ratio stored in the inertia compensation force correction map 67 will be described with reference to FIG. 7B. The inertia compensation force correction ratio has different characteristics depending on whether the acting directions of the damping force and the inertia compensation force are the same as illustrated in FIG. 7B.

Specifically, when the acting direction of the damping force is the same as that of the inertia compensation force (the driving force is increased by the inertia compensation force), the inertia compensation force correction ratio takes a fixed value LT7 (1, for example) indicated by a dashed line in FIG. 7B independently of the displacement of the stroke position.

When the acting direction of the damping force is different from that of the inertia compensation force (the driving force is reduced by the inertia compensation force), the inertia compensation force correction ratio takes values (LT7, LT8, LT9) indicated by a solid line in FIG. 7B depending on the displacement of the stroke position.

In the case where the stroke position is in the neutral region CT1, the inertia compensation force correction ratio is set to a fixed value of 1 as the inertia compensation force correction ratio LT7. In the case where the stroke position is in the extension end region CT3 or contraction end region CT3, the inertia compensation force correction ratio is set to a fixed value of 2/5 (0.4) as the inertia compensation force correction ratio LT9. In the case where the stroke position is in the middle regions CT2 and CT2, as the inertia compensation force correction ratio LT8, the inertia compensation force correction ratio is set to a variable that linearly decreases asymptotically as the stroke position approaches the extension end or contraction end.

The correction ratio LT9 is determined such that the inertia compensation force in the case where the stroke position is in the extension end region CT3 or contraction end region CT3 and the acting direction of the damping force is different from that of the inertia compensation force is smaller than that in the case where the stroke position is not in the extension end region CT3 or contraction end region CT3 because of the following reason. In the case where the stroke position is in the extension end region CT3 or contraction end region CT3, the vehicle is likely to go into full-bump or full-rebound. In addition, when the acting direction of the damping force is different from that of the inertia compensation force, the driving force based on the damping force is reduced by the inertia compensation force. In this case, if the inertia compensation force is reduced, the decrease in the driving force is reduced. This allows the driving force to be kept as large as possible. This is intended to inhibit the vehicle from going into full-bump or full-rebound.

When the acting direction of the damping force is the same as that of the inertia compensation force, the inertia compensation force correction ratio is set to the fixed value LT7 independently of the displacement of the stroke position, thus disabling the correction to reduce the inertia compensation force. Herein, when the acting direction of the damping force is the same as that of the inertia compensation force, the driving force based on the stretching force is increased by the inertia compensation force (fixed value). This can stably increase the driving force independently of the displacement of the stroke position, enhancing the vibration damping performance and providing a more comfortable ride of the vehicle 10.

The driving force calculation unit 47 according to the second embodiment calculates the standard value of the inertia compensation force that corresponds to the stroke acceleration with reference to the stroke acceleration calculated by the information conversion unit 43 and the contents stored in the inertia compensation force map 65. The driving force calculation unit 47 according to the second embodiment, by the multiplier 69, multiplies the standard value of the inertia compensation force calculated with reference to the contents stored in the inertia compensation force map 65, by the value of the inertia compensation force correction ratio calculated with reference to the inertia compensation force correction map 67, calculating the inertia compensation force corrected based on the stroke position.

The adder 59 of the driving force calculation unit 47 according to the second embodiment adds the standard value of the damping force calculated with reference to the damping force map 51 to the inertia compensation force corrected based on the stroke position to generate the driving force control signal including the target driving force. The thus generated driving force control signal including the target driving force is transmitted to the drive controller 49. Upon receiving the driving force control signal, the drive controller 49 drives and controls the plural electromagnetic actuators 13.

The electromagnetic suspension device 11 according to the second embodiment calculates a value of the inertia compensation force correction ratio that corresponds to the stroke position, with reference to the inertia compensation force correction map 67 and corrects the standard value of the inertia compensation force by using the thus calculated value of the inertia compensation force correction ratio. Accordingly, the inertia compensation force is finely corrected in accordance with the stroke position. The electromagnetic suspension device 11 according to the second embodiment is therefore capable of inhibiting the vehicle from going into full-bump or full-rebound in an extreme driving situation, as similar to the electromagnetic suspension device 11 according to the first embodiment.

Block Configuration of Driving Force Calculation Unit 47 and Peripherals According to Third Embodiment Next, the block configuration of the driving force calculation unit 47 of the ECU 15 included in the electromagnetic suspension device 11 according to a third embodiment (hereinafter, referred to as the driving force calculation unit 47 according to the third embodiment) will be described with reference to FIGS. 8A and 8B. FIG. 8A is a block configuration diagram of the driving force calculation unit 47 and the peripherals thereof according to the third embodiment. FIG. 8B is a view for explaining a spring control force correction map 73 included in the driving force calculation unit 47 illustrated in FIG. 8A.

Herein, many constituent components of the driving force calculation unit 47 according to the third embodiment are the same as those of the driving force calculation unit 47 according to the first embodiment. The different constituent components between the driving force calculation units 47 according to the first and third embodiments will be described in place of the driving force calculation unit 47 according to the third embodiment.

As illustrated in FIG. 8A, the driving force calculation unit 47 according to the third embodiment includes a spring control force map 71, the spring control force correction map 73, and a multiplier 75 in addition to the damping force map 51 and adder 59, which are the same constituent components as those of the driving force calculation unit 47 according to the first embodiment.

The spring control force map 71 according to the third embodiment stores standard values of spring control force altered in relation to changes of the stroke position acquired by the information acquisition unit 41.

Herein, the spring control force will be described. The electromagnetic actuator 13 is disposed side by side with the spring member provided between the body and wheel of the vehicle 10 as previously described. If the spring control force corresponding to the stroke position can be adjusted later so as to complement spring force exerted by the spring member, such adjustment contributes to improvements in ride performance of the vehicle 10 and steering stability of the vehicle 10. The driving force calculation unit 47 according to the third embodiment therefore includes a function to adjust the spring control force in order to improve the ride performance and steering stability of the vehicle 10.

In the example illustrated in FIG. 8A, the spring control force is configured to have the following characteristics. The spring control force directed to the contraction end increases linearly as the stroke position shifts towards the extension end. The spring control force directed to the extension end linearly increases as the stroke position shifts towards the contraction end. When the stroke position is in the neutral region, the spring control force corresponding thereto is set to zero.

The spring control force correction map 73 according to the third embodiment stores values of the spring control force correction ratio altered in relation to changes in the stroke position as illustrated in FIGS. 8A and 8B. The spring control force correction ratio takes a value between and including 0 and 1. The spring control force correction ratio is multiplied by the standard value of the spring control force acquired based on the stroke position and spring control force map 71. The standard value of the spring control force is thereby corrected to a value appropriate to the stroke position, which is constantly changing.

Herein, the characteristics of the spring control force correction ratio stored in the spring control force correction map 73 will be described with reference to FIG. 8B. The spring control force correction ratio has different characteristics depending on whether the acting direction of the damping force is the same as that of the spring control force as illustrated in FIG. 8B.

Specifically, when the acting direction of the damping force is different from that of the spring control force (the stretching force is reduced by the spring control force), the spring control force correction ratio takes a fixed value LT10 (2/5 (0.4), for example) indicated by a dashed line in FIG. 8B independently of the displacement of the stroke position.

When the acting direction of the damping force is the same as that of the spring control force (the stretching force is increased by the spring control force), the spring control force correction ratio takes values (LT10, LT11, LT12) indicated by a solid line in FIG. 8B depending on the displacement of the stroke position.

In the case where the stroke position is in the neutral region CT1, the spring control force correction ratio is set to a fixed value of 2/5 (0.4) as the spring control force correction ratio LT10. In the case where the stroke position is in the extension end region CT3 or contraction end region CT3, the spring control force correction ratio is set to a fixed value of 1 as the spring control force correction ratio LT12. In the case where the stroke position is in the middle regions CT2 and CT2, as the spring control force correction ratio LT11, the spring control force correction ratio is set to a variable that linearly increases asymptotically as the stroke position approaches the extension end or contraction end.

The correction ratio LT12 is determined such that the spring control force in the case where the stroke position is in the extension end region CT3 or contraction end region CT3 and the acting direction of the damping force is the same as that of the spring control force is smaller than that in the case where the stroke position is not in the extension end region CT3 or contraction end region CT3 because of the following reason. In the case where the stroke position is in the extension end region CT3 or contraction end region CT3, the vehicle is more likely to go into full-bump or full-rebound. In such a case, if the spring control force is increased, the target driving force obtained by integration of the damping force and the spring control force increases. The increase in the target driving force acts to shift the stroke position from the end regions CT3 to the neutral region CT1. This is intended to inhibit the vehicle from going into full-bump or full-rebound.

When the acting direction of the damping force is different from that of the spring control force, the spring control force correction ratio is set to the fixed value LT10 independently of the displacement of the stroke position, thus disabling the correction to increase the spring control force. Herein, when the acting direction of the damping force is different from that of the spring control force, the driving force based on the stretching force is reduced by the spring control force (fixed value). This can keep constant the decrease in driving force due to the spring control force (fixed value) independently of the displacement of the stroke position, enhancing the stability of vibration damping performance and providing a more comfortable ride of the vehicle 10.

The driving force calculation unit 47 according to the third embodiment calculates the standard value of the spring control force that corresponds to the stroke position, with reference to the stroke position acquired by the information acquisition unit 41 and the contents stored in the spring control force map 71. The driving force calculation unit 47 according to the third embodiment, by the multiplier 75, multiplies the standard value of the spring control force calculated with reference to the contents stored in the spring control force map 71, by the value of the spring control force correction ratio calculated with reference to the spring control force correction map 73, calculating the spring control force corrected based on the stroke position.

The adder 59 of the driving force calculation unit 47 according to the third embodiment adds the standard value of the damping force calculated with reference to the damping force map 51 to the spring control force corrected based on the stroke position to generate the driving force control signal including the target driving force obtained by integration of the damping force and spring control force. The thus generated driving force control signal including the target driving force is transmitted to the drive controller 49. Upon receiving the driving force control signal, the drive controller 49 drives and controls the plural electromagnetic actuators 13.

The electromagnetic suspension device 11 according to the third embodiment calculates a value of the spring control force correction ratio that corresponds to the stroke position, with reference to the spring control force correction map 73 and corrects the standard value of the spring control force by using the thus calculated value of the spring control force correction ratio. Accordingly, the spring control force is therefore finely corrected in accordance with the stroke position. The electromagnetic suspension device 11 according to the third embodiment is therefore capable of inhibiting the vehicle from going into full-bump or full-rebound in an extreme driving situation, as similar to the electromagnetic suspension device 11 according to the first embodiment.

Operational Effect of Electromagnetic Suspension Device 11 According to Embodiment of Present Invention Next, the operation effects of the electromagnetic suspension device 11 according to the embodiments of the present invention will be described.

The electromagnetic suspension device 11 based on a first aspect includes: the electromagnetic actuator 13, which is disposed side by side with the spring member provided between the body and wheel of the vehicle 10 and produces a driving force for the damping operation and stretching operation; the information acquisition unit 41, which acquires the stroke position of the electromagnetic actuator 13; and the ECU (driving force controller) 15, which sets the target damping force as the target value for the damping operation of the electromagnetic actuator 13 and the target stretching force as the target value for the extending and contracting operation and controls driving force of the electromagnetic actuator 13 by using a target driving force based on the set target damping force and stretching force.

When the stroke position acquired by the information acquisition unit 41 is in one of the end regions CT3, which are close to the stroke ends, the ECU (driving force controller) 15 corrects the target driving force such that the stroke position shifts from the end region CT3 toward the neutral region CT1.

According to the electromagnetic suspension device 11 based on the first aspect, when the stroke position acquired by the information acquisition unit 41 is in one of the end regions CT3, the ECU (driving force controller) 15 corrects the target driving force such that the stroke position shifts from the end region CT3 toward the neutral region CT1. The electromagnetic suspension device 11 based on the first aspect is capable of inhibiting the vehicle 10 from going into full-bump or full-rebound in an extreme driving situation.

The electromagnetic suspension device 11 based on a second aspect is the electromagnetic suspension device 11 based on the first aspect, in which the ECU (damping force controller) 15 sets the target inertia compensation force of the electromagnetic actuator 13 and, when the stroke position acquired by the information acquisition unit 41 is in one of the end regions CT3, which are close to the stroke ends, corrects the target inertia compensation force such that the target inertia compensation force is smaller than that when the stroke position is not in the end region CT3.

According to the electromagnetic suspension device 11 based on the second aspect, when the stroke position acquired by the information acquisition unit 41 is in one of the end regions CT3, which are close to the stroke ends, the target inertia compensation force is corrected so as to be smaller than that when the stroke position is not in the end regions CT3. The electromagnetic suspension device 11 based on the second aspect allows for fine correction of the inertia compensation force in accordance with the stroke position in addition to the effect of the electromagnetic suspension device 11 based on the first aspect.

The electromagnetic suspension device 11 based on a third aspect is the electromagnetic suspension device 11 based on the second aspect, in which, when the stroke position acquired by the information acquisition unit 41 is in one of the end regions CT3, which are close to the stroke ends, and the acting direction of the target damping force is different from that of the target inertia compensation force, the ECU (damping force controller) 15 performs correction to render the target inertia compensation force smaller than that when the stroke position is not in the end regions CT3.

According to the electromagnetic suspension device 11 based on the third aspect, when the acting direction of the target damping force is different from that of the target inertia compensation force and the stroke position acquired by the information acquisition unit 41 is in one of the end regions CT3, which are close to the stroke ends, the target inertia compensation force is corrected so as to be smaller than that when the stroke position is not in the end regions CT3. The electromagnetic suspension device 11 based on the third aspect allows for fine and practical correction of the inertia compensation force in accordance with whether the acting direction of the target damping force is different from that of the target inertia compensation force, in addition to the effect of the electromagnetic suspension device 11 based on the second aspect.

The electromagnetic suspension device 11 based on a fourth aspect is the electromagnetic suspension device 11 based on the third aspect, in which, when the stroke position acquired by the information acquisition unit 41 is in one of the end regions CT3, which are close to the stroke ends, but the acting direction of the target damping force is the same as that of the target inertia compensation force, the ECU (damping force controller) 15 disables the correction to render the target inertia compensation force smaller than that when the stroke position is not in the end regions CT3.

According to the electromagnetic suspension device 11 based on the fourth aspect, when the stroke position acquired by the information acquisition unit 41 is in one of the end regions CT3, which are close to the stroke ends, but the acting direction of the target damping force is the same as that of the target inertia compensation force, the correction to render the target inertia compensation force smaller than that when the stroke position is not in the end region CT3 is disabled. The electromagnetic suspension device 11 based on the fourth aspect can stably increase the driving force irrespectively of the displacement of the stroke position, thus improving the vibration damping performance and providing a more comfortable ride of the vehicle 10.

The electromagnetic suspension device 11 based on a fifth aspect is the electromagnetic suspension device 11 based on any one of the first to fourth aspects, in which the ECU (damping force controller) 15 sets the target spring control force of the electromagnetic actuator 13 and, when the stroke position acquired by the information acquisition unit 41 is in one of the end regions CT3, which are close to the stroke ends, performs correction to render the target spring control force larger than that when the stroke position is not in the end regions CT3.

According to the electromagnetic suspension device 11 based on the fifth aspect, when the stroke position acquired by the information acquisition unit 41 is in one of the end regions CT3, which are close to the stroke ends, the target spring control force is corrected so as to be larger than that when the stroke position is not in the end regions CT3. The electromagnetic suspension device 11 based on the fifth aspect allows for fine correction of the spring control force in accordance with the stroke position in addition to the effects of the electromagnetic suspension device 11 based on the first aspect.

The electromagnetic suspension device 11 based on a sixth aspect is the electromagnetic suspension device 11 based on the fifth aspects, in which, when the stroke position acquired by the information acquisition unit 41 is in one of the end regions CT3, which are close to the stroke ends, and the acting direction of the target damping force is the same as the acting direction of the target spring control force, the ECU (damping force controller) 15 performs correction to render the target spring control force larger than that when the stroke position is not in the end regions CT3.

According to the electromagnetic suspension device 11 based on the sixth aspect, when the acting direction of the target damping force is the same as the acting direction of the target spring control force, the target spring control force is corrected so as to be larger than that when the stroke position is not in the end regions CT3. The electromagnetic suspension device 11 based on the sixth aspect allows for fine and practical correction of the spring control force in accordance with whether the acting direction of the target damping force is the same as the acting direction of the target spring control force, in addition to the effects of the electromagnetic suspension device 11 based on the fifth aspect.

The electromagnetic suspension device 11 based on a seventh aspect is the electromagnetic suspension device 11 based on the sixth aspect, in which, when the stroke position acquired by the information acquisition unit 41 is in one of the end regions CT3, which are close to the stroke ends, but the acting direction of the target damping force is different from the acting direction of the target spring control force, the ECU (damping force controller) 15 disables the correction to render the target spring control force larger than that when the stroke position is not in the end regions CT3.

According to the electromagnetic suspension device 11 based on the seventh aspect, when the stroke position acquired by the information acquisition unit 41 is in one of the end regions CT3, which are close to the stroke ends, but the acting direction of the target damping force is different from the acting direction of the target spring control force, the correction to render the target spring control force larger than that when the stroke position is not in the end region CT3 is disabled. This can keep constant the decrease in the driving force due to the spring control force irrespectively of the displacement of the stroke position, thus improving the vibration damping performance and providing a more comfortable ride of the vehicle 10, in addition to the effects of the electromagnetic suspension device 11 based on the sixth aspect.

Other Embodiments

The plural embodiments described above show embodied examples of the present invention. The technical scope of the present invention should not be definitely understood. The present invention can be implemented in various forms without departing from the spirit or the major features thereof.

In the description of the first embodiment according to the present invention, for example, the active control current value corresponding to the active control amount is calculated by multiplying the standard value of the active control amount calculated by the active control amount calculation unit 53 by the value of the active control amount correction ratio calculated with reference to the active control amount correction map 55. However, the present invention is not limited to this example. The active control current value corresponding to the active control amount may be calculated as follows. The standard value of the damping force calculated with reference to the damping force map 51 is added to the standard value of the active control amount calculated by the active control amount calculation unit 53, which is then multiplied by the value of the active control amount correction ratio that is altered in relation to changes in the stroke position.

In the description of the embodiments according to the present invention, the electromagnetic actuators 13 include the four electromagnetic actuators 13 provided for the front wheels (right and left front wheels) and the rear wheels (right and left rear wheels). However, the present invention is not limited to this example. The electromagnetic actuators 13 may include two electromagnetic actuators 13 for either front or rear wheels.

In the description of the electromagnetic suspension device 11 according to the embodiments of the present invention, the correction ratio values LT1 to LT12 are set to values considered to be appropriate. The present invention is not limited to this example. The correction ratio values LT1 to LT12 may employ proper values obtained by experiments, simulations, and the like.

In the description of the electromagnetic suspension device 11 according to the embodiments of the present invention, the information acquisition unit 41 acquires the information including the stroke position of the electromagnetic actuator 13 and the sprung mass acceleration detected by the sprung mass acceleration sensor 40. The present invention is not limited to this example. The information acquired by the information acquisition unit 41 may include information of the load carried by the vehicle 10. In this case, the information conversion unit 43 may be configured to adjust the standard value (the central value of the stroke position, for example) of the stroke position of the electromagnetic actuator 13 based on the information including the load carried by the vehicle 10.

What is claimed is:

1. An electromagnetic suspension device, comprising:
   an electromagnetic actuator which is disposed side by side with a spring member provided between a body and a wheel of a vehicle and which produces a driving force for damping operation and extending and contracting operation;
   an information acquisition unit which acquires a stroke position of the electromagnetic actuator; and
   a driving force controller which sets a target damping force as a target value for the damping operation of the electromagnetic actuator, and a target stretching force as a target value for the extending and contracting operation, and controls the driving force of the electromagnetic actuator by using a target driving force based on the set target damping force and target stretching force, wherein
   when the stroke position acquired by the information acquisition unit is in an end region close to a stroke end, the driving force controller corrects the target driving force such that the stroke position shifts from the end region toward a neutral region, and
   the driving force controller sets a target inertia compensation force of the electromagnetic actuator and corrects the target inertia compensation force, when the stroke position acquired by the information acquisition unit is in the end region close to the stroke end, to render the target inertia compensation force smaller than that when the stroke position is not in the end region.

2. The electromagnetic suspension device according to claim 1, wherein
   when the stroke position acquired by the information acquisition unit is in the end region close to the stroke end and an acting direction of the target damping force is different from an acting direction of the target inertia compensation force, the driving force controller performs correction to render the target inertia compensation force smaller than that when the stroke position is not in the end region.

3. The electromagnetic suspension device according to claim 2, wherein
   even when the stroke position acquired by the information acquisition unit is in the end region close to the stroke end, but if the acting direction of the target damping force is the same as the acting direction of the target inertia compensation force, the driving force controller disables the correction to render the target inertia compensation force smaller than that when the stroke position is not in the end region.

4. The electromagnetic suspension device according to claim 1, wherein
   the driving force controller sets a target spring control force of the electromagnetic actuator and corrects the target spring control force, when the stroke position acquired by the information acquisition unit is in the end region close to the stroke end, to render the target spring control force larger than that when the stroke position is not in the end region.

5. The electromagnetic suspension device according to claim 4, wherein
when the stroke position acquired by the information acquisition unit is in the end region close to the stroke end and an acting direction of the target damping force is the same as an acting direction of the target spring control force, the driving force controller performs the correction to render the target spring control force larger than that when the stroke position is not in the end region.

6. The electromagnetic suspension device according to claim 5, wherein
even when the stroke position acquired by the information acquisition unit is in the end region close to the stroke end, but if the acting direction of the target damping force is different from the acting direction of the target spring control force, the driving force controller disables the correction to render the target spring control force larger than that when the stroke position is not in the end region.

* * * * *